United States Patent [19]
Katz

[11] Patent Number: 6,151,387
[45] Date of Patent: *Nov. 21, 2000

[54] TELEPHONIC-INTERFACE GAME CONTROL SYSTEM

[75] Inventor: Ronald A. Katz, Los Angeles, Calif.

[73] Assignee: Ronald A. Katz Technology Licensing, L.P., Los Angeles, Calif.

[*] Notice: This patent is subject to a terminal disclaimer.

[21] Appl. No.: 09/128,936

[22] Filed: Aug. 5, 1998

Related U.S. Application Data

[63] Continuation of application No. 08/559,538, Nov. 16, 1995, Pat. No. 5,793,846, which is a continuation of application No. 08/073,585, Jun. 7, 1993, Pat. No. 5,553,120, which is a continuation of application No. 07/534,907, Jun. 8, 1990, Pat. No. 5,218,631, which is a continuation-in-part of application No. 07/335,923, Apr. 10, 1989, which is a continuation of application No. 07/194,258, May 16, 1988, Pat. No. 4,845,739, which is a continuation-in-part of application No. 07/018,244, Feb. 24, 1987, Pat. No. 4,792,968, which is a continuation-in-part of application No. 06/753,299, Jul. 10, 1985, abandoned.

[51] Int. Cl.$^7$ ..................................................... H04M 1/64

[52] U.S. Cl. ..................................... 379/93.13; 379/88.24

[58] Field of Search ............................... 379/93.13, 88.22, 379/88.23, 88.25, 91.02, 93.27, 127, 201

[56] References Cited

U.S. PATENT DOCUMENTS

| | | |
|---|---|---|
| 2,902,541 | 9/1959 | Singleton . |
| 3,246,082 | 4/1966 | Levy . |
| 3,393,272 | 7/1968 | Hanson . |
| 3,394,246 | 7/1968 | Goldman . |
| 3,544,769 | 12/1970 | Hedin . |
| 3,556,530 | 1/1971 | Barr . |
| 3,594,004 | 7/1971 | Barr . |
| 3,617,638 | 11/1971 | Jochimsen et al. . |
| 3,644,675 | 2/1972 | Waltington . |
| 3,688,126 | 8/1972 | Klein . |
| 3,696,335 | 10/1972 | Lemelson . |
| 3,794,774 | 2/1974 | Kemmerly et al. . |
| 3,800,283 | 3/1974 | Gropper . |
| 3,881,160 | 4/1975 | Ross . |

(List continued on next page.)

FOREIGN PATENT DOCUMENTS

| | | |
|---|---|---|
| 66113/81 | 7/1981 | Australia . |
| 1022674 | 12/1977 | Canada . |
| 1025118 | 1/1978 | Canada . |

(List continued on next page.)

OTHER PUBLICATIONS

Lexis Search Results (Great American Potato–Chip giveaway/Raisin Bran Game/Giants Baseball Trivia—Dial Info): "In The Chips" AdWeek, Jul. 22, 1985.

(List continued on next page.)

*Primary Examiner*—Fan S. Tsang
*Attorney, Agent, or Firm*—Lyon & Lyon LLP

[57] ABSTRACT

A control system CS interfaces a multiplicity of individual terminals T1–Tn through a telephone network facility CO to accommodate game formats. At the terminals T1–Tn, callers are prompted by voice-generated instructions to provide digital data that is identified for positive association with a caller and stored, as for processing. Calls are conditionally accepted based on a test of preliminary identification data (ANI or DNIS). Computer generated designations are assigned to callers and stored. Questions for game use are stored in banks, classified by order of difficulty for selection according to various formats. Specific game formats accommodate various time criteria and caller selection of degree of risk. Caller data is stored in cells along with statistical and identification data; also, key contest data is held accessible in a cache memory for reporting. Caller data may be processed individually or in interrelated formats as with reference to random or source data as to establish progressive subsets. A break-off control circuit may terminate the computer interface aborting to a manual terminal for direct communication with an operator. Real-time operation processing is an alternative to subsequently processing stored data.

33 Claims, 3 Drawing Sheets

U.S. PATENT DOCUMENTS

| | | |
|---|---|---|
| 3,889,050 | 6/1975 | Thompson . |
| 3,909,553 | 9/1975 | Marshall . |
| 3,912,874 | 10/1975 | Botterell et al. . |
| 3,918,174 | 11/1975 | Miller et al. . |
| 3,934,095 | 1/1976 | Matthews et al. . |
| 3,947,972 | 4/1976 | Freeman . |
| 3,950,618 | 4/1976 | Bloisi . |
| 3,998,465 | 12/1976 | Mascola . |
| 4,017,835 | 4/1977 | Randolph . |
| 4,054,756 | 10/1977 | Comella et al. . |
| 4,071,698 | 1/1978 | Barger, Jr. et al. . |
| 4,078,316 | 3/1978 | Freeman . |
| 4,090,038 | 5/1978 | Biggs . |
| 4,117,278 | 9/1978 | Ehrlich et al. . |
| 4,121,052 | 10/1978 | Richard . |
| 4,145,578 | 3/1979 | Orriss . |
| 4,162,377 | 7/1979 | Mearns . |
| 4,191,376 | 3/1980 | Goldman . |
| 4,191,860 | 3/1980 | Weber . |
| 4,194,089 | 3/1980 | Hashimoto . |
| 4,241,942 | 12/1980 | Bachman . |
| 4,242,539 | 12/1980 | Hashimoto . |
| 4,243,844 | 1/1981 | Waldman . |
| 4,255,618 | 3/1981 | Danner et al. . |
| 4,264,924 | 4/1981 | Freeman . |
| 4,264,925 | 4/1981 | Freeman et al. . |
| 4,277,649 | 7/1981 | Sheinbein . |
| 4,290,141 | 9/1981 | Anderson et al. . |
| 4,299,637 | 11/1981 | Oberdeck et al. . |
| 4,302,810 | 11/1981 | Bouricius et al. . |
| 4,314,103 | 2/1982 | Wilson . |
| 4,345,315 | 8/1982 | Cadotte et al. . |
| 4,348,554 | 9/1982 | Asmuth . |
| 4,355,207 | 10/1982 | Curtin . |
| 4,376,875 | 3/1983 | Beirn . |
| 4,398,708 | 8/1983 | Goldman et al. . |
| 4,439,636 | 3/1984 | Newkirk et al. . |
| 4,468,528 | 8/1984 | Reece et al. . |
| 4,489,438 | 12/1984 | Hughes . |
| 4,490,583 | 12/1984 | Bednarz et al. . |
| 4,521,643 | 6/1985 | Dupuis et al. . |
| 4,523,055 | 6/1985 | Hohl et al. . |
| 4,532,378 | 7/1985 | Nakayama et al. . |
| 4,541,087 | 9/1985 | Comstock . |
| 4,549,047 | 10/1985 | Brian et al. . |
| 4,555,594 | 11/1985 | Friedes et al. . |
| 4,562,342 | 12/1985 | Solo . |
| 4,566,030 | 1/1986 | Nickerson et al. . |
| 4,567,359 | 1/1986 | Lockwood . |
| 4,570,930 | 2/1986 | Matheson . |
| 4,577,062 | 3/1986 | Hilleary et al. . |
| 4,577,067 | 3/1986 | Levy et al. . |
| 4,578,700 | 3/1986 | Roberts et al. . |
| 4,580,012 | 4/1986 | Matthews et al. . |
| 4,582,956 | 4/1986 | Doughty . |
| 4,584,602 | 4/1986 | Nakagawa . |
| 4,585,906 | 4/1986 | Matthews et al. . |
| 4,586,707 | 5/1986 | McNeight et al. . |
| 4,587,379 | 5/1986 | Masuda . |
| 4,591,190 | 5/1986 | Clark . |
| 4,611,094 | 9/1986 | Asmuth et al. . |
| 4,614,367 | 9/1986 | Breen . |
| 4,625,276 | 11/1986 | Benton et al. . |
| 4,630,200 | 12/1986 | Ohmae et al. . |
| 4,630,201 | 12/1986 | White . |
| 4,634,809 | 1/1987 | Paulsson et al. . |
| 4,652,998 | 3/1987 | Koza . |
| 4,658,417 | 4/1987 | Hashimoto et al. . |
| 4,663,777 | 5/1987 | Szeto . |
| 4,671,512 | 6/1987 | Bachman et al. . |
| 4,674,044 | 6/1987 | Kalmus et al. . |
| 4,677,553 | 6/1987 | Roberts et al. . |
| 4,694,490 | 9/1987 | Harvey et al. . |
| 4,697,282 | 9/1987 | Winter et al. . |
| 4,704,725 | 11/1987 | Harvey et al. . |
| 4,706,275 | 11/1987 | Kamil . |
| 4,716,583 | 12/1987 | Groner et al. . |
| 4,745,468 | 5/1988 | Von Kohorn . |
| 4,756,020 | 7/1988 | Fodale . |
| 4,761,684 | 8/1988 | Clark et al. . |
| 4,763,191 | 8/1988 | Gordon et al. . |
| 4,764,666 | 8/1988 | Bergeron . |
| 4,766,604 | 8/1988 | Axberg . |
| 4,774,655 | 9/1988 | Kollin et al. . |
| 4,781,377 | 11/1988 | McVean et al. . |
| 4,785,408 | 11/1988 | Britton et al. . |
| 4,788,682 | 11/1988 | Vij et al. . |
| 4,788,715 | 11/1988 | Lee . |
| 4,788,718 | 11/1988 | McNabb et al. . |
| 4,792,968 | 12/1988 | Katz . |
| 4,796,293 | 1/1989 | Blinken et al. . |
| 4,797,910 | 1/1989 | Daudelin . |
| 4,797,913 | 1/1989 | Kaplan et al. . |
| 4,805,209 | 2/1989 | Baker, Jr. et al. . |
| 4,812,843 | 3/1989 | Champion, III et al. . |
| 4,815,121 | 3/1989 | Yoshida . |
| 4,827,500 | 5/1989 | Binkerd et al. . |
| 4,842,278 | 6/1989 | Markowicz . |
| 4,845,739 | 7/1989 | Katz . |
| 4,847,890 | 7/1989 | Solomon et al. . |
| 4,852,154 | 7/1989 | Lewis et al. . |
| 4,866,756 | 9/1989 | Crane et al. . |
| 4,882,473 | 11/1989 | Bergeron et al. . |
| 4,893,328 | 1/1990 | Peacock . |
| 4,894,857 | 1/1990 | Szlam et al. . |
| 4,896,345 | 1/1990 | Thorne . |
| 4,899,375 | 2/1990 | Bauer et al. . |
| 4,907,079 | 3/1990 | Turner et al. . |
| 4,937,853 | 6/1990 | Brule et al. . |
| 4,942,598 | 7/1990 | Davis . |
| 4,964,157 | 10/1990 | Aoshima . |
| 4,965,825 | 10/1990 | Harvey et al. . |
| 4,969,185 | 11/1990 | Dorst et al. . |
| 4,972,461 | 11/1990 | Brown et al. . |
| 4,996,705 | 2/1991 | Entenmann et al. . |
| 5,001,710 | 3/1991 | Gawrys et al. . |
| 5,003,574 | 3/1991 | Deng et al. . |
| 5,014,298 | 5/1991 | Katz . |
| 5,017,917 | 5/1991 | Fisher et al. . |
| 5,018,736 | 5/1991 | Pearson et al. . |
| 5,023,904 | 6/1991 | Kaplan et al. . |
| 5,046,183 | 9/1991 | Dorst et al. . |
| 5,083,272 | 1/1992 | Walker et al. . |
| 5,097,528 | 3/1992 | Gursahaney et al. . |
| 5,109,414 | 4/1992 | Harvey et al. . |
| 5,127,003 | 6/1992 | Doll, Jr. et al. . |
| 5,146,491 | 9/1992 | Silver et al. . |
| 5,181,238 | 1/1993 | Medamana et al. . |
| 5,233,654 | 8/1993 | Harvey et al. . |
| 5,255,183 | 10/1993 | Katz . |
| 5,263,723 | 11/1993 | Pearson et al. . |
| 5,333,185 | 7/1994 | Burke et al. . |
| 5,335,277 | 8/1994 | Harvey et al. . |
| 5,351,276 | 9/1994 | Doll, Jr. et al. . |
| 5,353,335 | 10/1994 | D'Urso et al. . |
| 5,415,416 | 5/1995 | Scagnelli et al. .................... 379/93.13 |

FOREIGN PATENT DOCUMENTS

| | | |
|---|---|---|
| 1056500 | 6/1979 | Canada . |
| 1059621 | 7/1979 | Canada . |
| 1162336 | 2/1984 | Canada . |
| 1225759 | 8/1987 | Canada . |

| | | |
|---|---|---|
| 2009937 | 8/1990 | Canada . |
| 0 120 322 | 2/1984 | European Pat. Off. . |
| 0 229 170 | 7/1987 | European Pat. Off. . |
| 0249575 | 12/1987 | European Pat. Off. . |
| 0295837 | 12/1988 | European Pat. Off. . |
| 0342295 | 11/1989 | European Pat. Off. . |
| 0434181 | 6/1991 | European Pat. Off. . |
| 0 568 114 | 11/1993 | European Pat. Off. . |
| 0 620 669 | 10/1994 | European Pat. Off. . |
| 9002131 | 8/1990 | France . |
| 2929416 | 2/1981 | Germany . |
| 3726366 | 2/1988 | Germany . |
| 4005365 A1 | 8/1990 | Germany . |
| 52-17740 | 9/1977 | Japan . |
| 56-152365 | 11/1981 | Japan . |
| 62-239757 | 10/1987 | Japan . |
| 63-500138 | 1/1988 | Japan . |
| 2-298158 | 12/1990 | Japan . |
| 3-41855 | 2/1991 | Japan . |
| 2184327 | 6/1987 | United Kingdom . |
| 2 230 403 | 10/1990 | United Kingdom . |
| WO 87/00375 | 1/1987 | WIPO . |
| WO88/02966 | 4/1988 | WIPO . |
| WO88/05985 | 8/1988 | WIPO . |
| WO89/02139 | 3/1989 | WIPO . |
| WO89/09530 | 10/1989 | WIPO . |
| WO93/05483 | 3/1993 | WIPO . |

OTHER PUBLICATIONS

"San–Fran–Police–League", Business Wire, Aug. 2, 1985.
"Similar Campaigns", DM News, Dec. 15, 1985.
"Phone Offers Action At Push Of Button", Advertising Age, Feb. 6, 1986.
Boies, Stephen J., "A Computer Based Audio Communication System", Computer Sciences Department, Thomas J. Watson Research Center, Yorktown Heights, New York, USA, pp. 701–704—(Article) (Undated).
Winckelmann, W.A., "Automatic Intercept Service", Bell Laboratories Record, May 1968, vol. 46, No. 5, pp. 138–143—(Article).
"Proposed Agreement Between National Enterprises Board (N.E.B.) and Delphi", Jan. 30, 1979.
Voysey, Hedley, "Nexos wins rights to comms engine", Computing, Sep. 6, ??, vol. 7, No. 36—(Article).
"Appraisal Of The Fair Market Value Of Delphi Communications", Apr. 30, 1980—(Study) Delphi Communications—(Charts and Exhibits).
"Voice–Response System Improves Order Entry, Inventory Control", Communication News, Aug. 1976—(Article).
"Periphonics Voicepack"—(Brochure) (Undated).
"The Voice Response Peripheral That Turnes Every Touch––Tone Telephone Into A Computer Terminal", Periphonics Corporation—(Brochure) (Undated).
Rabin, Jeff, "Minorities Seek 30% Share of All Lottery Operations", Sacramento Bee, Apr. 12, 1985—(Article).
Advertisements (Dial Giants Baseball Trivia Game): San Francisco Chronicle, Jul. 3, 1984.
Curtis, Cathy, "976 numbers let you dial–a–whatever", San Francisco Business Journal, Nov. 26, 1984—(Article).
Ferrell, Jane, "Three little numbers for instant information", San Francisco Chronicle, Aug. 15, 1984—(Article).
"Dallas Telephone Call–In Game Uses Computer Voice Interface", Sep. 24, 1984—(Press Release).
Rivest, R.L., et al., "A Method for Obtaining Digital Signatures and Public–Key Cryptosystems", Communications of the ACM, Feb. 1978, vol. 21, No. 2, pp. 120–126—(Article).

Finnigan, Paul F, "Audiotex: The telephone as data–access equipment", Data Communications, 1987, pp. 155–161 (Article).
Ozawa, Y., et al., "Voice Response System and Its Applications", Hitachi Review, Dec. 1979, vol. 28, No. 6. pp. 301–305—(Article).
"AT&T 2: Reaches agreement with Rockwell (ROK)", Aug. 26, 1986—(Press Release).
"AT&T: Expands Computer speech system product line", Apr. 14, 1986—(Press Release).
Adams, Cynthia "Conversing With Computers", Computerworld on Communications, May 18, 1983, vol. 17, No. 20A, pp. 36–44—(Article).
Hester, S.D., et al., "The AT&T Multi–Mode Voice Systems—Full Spectrum Solutions For Speech Processing Applications", Sep. 1985, pp. 1–10—(Proceedings Of The 1985 AVIOS Conference).
Davidson, Leon, "A Pushbutton Telephone For Alphanumeric Input", Datamation, Apr. 1966, pp. 27–30—(Article).
Advertisement: Cuervo Gold Beach Chair, VoiceMail Int'l, '83.
"Digital's All–In–1 Voice Messaging", Digital—(Brochure) (Undated).
"Access Voice and Mail Messages From One Familiar Source", Insight,—(Article) (Undated).
"Get The Message . . . !" "New VoiceMail Features", Voicemail International, Inc., Oct. 1984—(Article).
Brochures (TWA Crew Scheduling/PSA's Reservation System/Universal Studios Program/Dow Phone): "AVIAR The communication system that keeps you flying", VoiceMail Int'l,—(Brochure) (Undated).
"TWA Voicemail, Flight Attendants Users Guide" Aug. 1986,—(Brochure).
Holtzman, Henry, "Voice Mail Soars At TWA", Modern Office Technology (Reprint), Mar. 1986,—(Article).
"Bids Results via Voicemail—Flight Deck Crew Members", May 1, 1985 (Script).
Borden, W.S., "Flight Attendant Self Input Of Monthly Bids Via Touch Tone Telephone", In–Flight Services Bulletin, Sep. 15, 1985—(Memo).
"Look Ma, no operators! Automatic voice system doesmany airline jobs", Air Transport World, Oct. 1986—(Article).
"1,000,000 Shares Common Stock" Voicemail International, Inc.,, Jan. 10, 1984—(Public Offering Summary).
Levinson, S.E., et al., "A Conversational–Mode Airline Information and Reservation System Using Speech Input and Output", The Bell System Technical Journal, Jan. 1980, vol. 59, No. 1, pp. 119–137.
Emerson, S.T., "Voice Response Systems—Technology to the Rescue for Business Users", Speech Technology, Jan./Feb. '83, pp. 99–103—(Article).
Moslow, Jim, "Emergency reporting system for small communities", Telephony, Feb. 11, 1985, pp. 30–32, 34—(Article).
Rabiner, L.R., et al., "Digital Techniques for Computer Voice Response: Implementation and Applications", Proceedings Of The IEEE, Apr. 1976, vol. 64, No. 4, pp. 416–432—(Article).
Moosemiller, J.P., "AT&T's Conversant™ I Voice System" Speech Technology, Mar./Apr. 1986, pp. 88–93—(Article).
Frank, R.J., et al., "No. 4 ESS: Mass Announcement Capability", The Bell System Technical Journal, Jul./Aug. 1981, vol. 60, No. 6, Part 2, pp. 1049–1081—(Chapter from a Book).

"Chapter I General Description" *D.I.A.L. PRM/Release3—Version 2* Mar. 1987 (Product Reference Manual).

"Announcing Release 3.3" *D–A–S–H– D.I.A.L. Application and Support Hints*, Jan./Feb. Mar. 1987, vol. 3, No. 1—(Brochure).

"D.I.A.L. Software Relase 4", *OPCOM*, Jan. 1988, Version 1—(Product Reference Manual).

Brady, R.L., et al., "Telephone Identifier Interface", *IBM Technical Disclosure Bulletin*, Oct. 1976, vol. 19, No. 5, pp. 1569–1571—(Article).

Corbett, A.J., "Telephone Enquiry System Using Synthetic Speech", *University of Essex*, Dec. 1974, (Thesis).

Yoshizawa, K., et al., "Voice Response System for Telephone Betting", *Hitachi Review*, Jun. 1977, vol. 26, No. 6, (Article).

Sagawa, S., et al., "Automatic Seat Reservation By Touch-Tone Telephone", *Second USA Japan Computer Conference*, 1975, vol. 2, pp. 290–294—(Article).

Smith, S.L., "Computer–Generated Speech and Man–Computer Interaction", *Human Factors*, 1970, 12(2), pp. 215–223—(Article).

Newhouse, A., et al., "On The Use Of Very Low Cost Terminals", *University of Houston*, pp. 240–249—(Paper) (Undated).

Mullen, R.W., "Telephone—home's 'friendliest' Computer", *Inside Telephone Engineer And Management*, May 15, 1985, vol. 89, No. 10,—(Article).

"Telephone Computing Entering Service Bureau Business", *American Banker*, Jul. 5, 1979—(Article).

Kutler, Jeffrey, "Technology, System Sharing Improve Phone Banking Outlook", *American Banker*, Dec. 7, 1979, vol. CXLIV, No. 237—(Article).

Kutler, Jeffrey, "Phone Bill Paying Accessed by Pioneer", *American Banker*, Dec. 7, 1979, vol. CXLIV, No. 237—(Article).

"User's Guide", *Dowphone* (Undated).

"Audiotex Information From Dow Jones", *The Computer Review*, Nov. 1984, vol. 2, No. 1—(Article).

"Dow Phone Adds Innovest Systems' Technical Analysis Reports" *IDP Report*, Jan. 3, 1986—(Report).

Perdue, R.J., et al., "Conversant 1 Voice System: Architecture and Applications", *AT & T Technical Journal*, Sep./Oct. 1986—(Article).

Martin, James, "Design of Man–Computer Dialogues", *IBM System Research Institute*, Chapter 16, pp. 283–306—(Chapter from a Book) (Undated).

Kaiserman, D.B., "The Role Of Audio Response In Data Collection Systems", *Proceedings of the Technical Sessions*, Paleis des Expositions, Geneva, Switzerland, Jun. 17–19, 1980, pp. 247–251—(Article).

Boies, S.J., et al., "User Interface for Audio Communication System", *IBM Technical Disclosure Bulletin*, Dec. 1982, vol. 25, No. 7A, pp. 3371–3377—(Article).

Kramer, J.J., "Human Factors Problems in the Use of Pushbutton Telephones for Data Entry", *Bell Telephone Laboratories*, Holmdel, N.J., Apr. 74, pp. 241–258—(Paper).

Cox, Jr., Floyd, "Flora Fax", Jan. 22, 1986—(Letter and Advertisements).

Isayama, Tetsuya, "Automatic Response Processing Equipment as a Multi–media Communication Node", *Japan Telecommunications Review*, 1987, vol. 29, No. 1, pp. 29–36—(Article).

Imai, Y., et al., "Shared Audio Information System Using New Audio Response Unit" *Japan Telecommunications Review*, Oct. 1981, vol. 23, No. 4, pp. 383–390—(Article).

"Distrust of computer kills home service plan" (date and source missing).

"Automatic Call Distributor/Management Information System: Interface between 1/1AESS™ Switch Central Office and Customer Premises Equipment", *Bell Communications Research*, Dec. 1986, Technical Reference TR–TSY–000306, Issue 1—(Article).

"Comparison Of ACD Systems", *Connection*, Feb. 1990—(Chart).

"ACD Comparison", *Aspect*, Feb. 2, 1990—(Final Report).

"AT&T's Response to Plaintiff's Second Set of Interrogatories to Defendant AT&T Corp. (Nos. 17–18)", *Ronald A. Katz Technology Licensing, L.P. and MCI Telecommunications Corp.*, Civil Action No. 97–4453 (USDC, ED PA).

Borison, V.S., "Transaction—telephone gets the fact at the point of sale", *Bell Laboratories Record*, Oct. 1975, pp. 377–383—(Article).

Demeautis, M., et al., "The TV 200 A Transactional Telephone", *Commutation & Transmission n 5*, 1985, pp. 71–82—(Article).

Eriksson, G., et al., "Voice and Data Workstations and Services in the ISDN", *Ericsson Review*, May 1984, pp. 14–19–(Article).

Schrage, Michael, "A Game Von Meister in Pursuit of Profits", *Washington Post*, Sep. 23, 1985—(Article).

Svigals, J., "Low Cost Point–Of–Sale Terminal", *IBM Technical Disclosure Bulletin*, Sep. 1982, vol. 25, No. 4, p. 1835.

Turbat, A., "Telepayment And Electronic Money The Smart Card", *Commutation & Transmission n 5*, 1982, pp. 11–20–(Article).

"Voice Mail", *Sound & Communications*, Apr. 1983, vol. 28, No. 12, pp. 84–85—(Article).

Aso, Satoshi, "Trends and Applications of Voice Output Devices", *2209 J.E.E. Journal of Electronic Engineering*, Feb. 1982, vol. 19, No. 182, pp. 102–107—(Article).

Kroemer, F., "Telebox", Unterrichtsblätter, year 38/1985, No. 4, pp. 131–141 (Article)—no translation.

Kroemer, F., "Telebox", Unterrichstblätter, year 41/1988, No. 2, pp. 67–83 (Article)—no translation.

C.R. Newson, "Merlin Voice Mail VM600," British Telecommunications Engineering, vol. 4, Apr. 1985, pp. 32–35.

A.S. Yatagai, "Telephonic Voice Synthesis Systems," Telecommunications, Aug. 1985, pp. 56h–l, 68.

A.J. Waite, "Getting Personal With New Technologies For Telemarketers," DM News, Feb. 15, 1987 at 50.

"Shopping via a network is no longer just talk," Data Communications, Aug. 1981 at 43.

"Growth–Oriented Systems," Restaurant Technology, Nation's Restaurant News Newspaper, Jul. 1, 1985 at 51.

"Let your fingers do the tapping . . . and the computer the talking," Modern Office Tech., May 1984 at 80.

"American Software unveils systems for IBM mainframes," Computerworld, Mar. 26, 1984 at 59.

"Business Units Get Order Entry," Computerworld, Jul. 12, 1982 at 36.

Basinger, R. G., et al., "Calling Card Service—Overall Description and Operational Characteristics", The Bell System Technical Journal, Sep., 1982.

Confalone, D. E., et al. "Calling Card Service—TSPS Hardware, Software, and Signaling Implementation", The Bell System Technical Journal, Sep., 1982.

Eigen, D.J., et al., "Calling Card Service—Human Factors Studies", The Bell Technical Journal, Sep., 1982.

Lexis Search, Nov. 1, 1984, re: System 85 Computer Process.

Lexis Search, Jan. 28, 1985, re: Rolm Releases Four–Channel Phonemail Voice Message Unit.

TELEPHONIC-INTERFACE GAME CONTROL SYSTEM

This is a continuation of application Ser. No. 08/559,538 filed Nov. 16, 1995, which will issue as U.S. Pat. No. 5,793,846 on Aug. 11, 1998, which is a continuation of application Ser. No. 08/073,585, filed Jun. 7, 1993, now U.S. Pat. No. 5,553,120; which is a continuation of application Ser. No. 07/534,907, filed Jun. 8, 1990, now U.S. Pat. No. 5,218,631, which is a continuation-in-part of application Ser. No. 07/335,923, filed Apr. 10, 1989, which is a continuation of application Ser. No. 07/194,258, filed May 16, 1988, now U.S. Pat. No. 4,845,739, which is a continuation-in-part of application Ser. No. 07/018,244, filed Feb. 24, 1987, now U.S. Pat. No. 4,792,968, which is a continuation-in-part of application Ser. No. 06/753,299, filed Jul. 10, 1985, now abandoned.

BACKGROUND AND SUMMARY OF THE INVENTION

1. Prior-Art Considerations

To efficiently accomplish various functions, it has been proposed to interface persons at telephone calling terminals directly with a computer facility. In accordance with such arrangements, computer-generated voice messages prompt callers to provide digital data by actuating the numeric buttons that are conventionally employed for dialing from one telephone terminal to another. Such techniques have been widely used; however, a need exists for expanded operating capabilities, as to accommodate various game formats.

2. Invention Summary general, the present invention comprises a telephonic-interface system and related processes for selectively utilizing both analog (voice) and digital telephonic communication in a variety of different game formats or programs, as to accommodate a vast number of participants. For example, after approval of a caller (based on telephone number signals) calls are accepted, designations are provided and a voice generator prompts individual callers to provide digital data for a game record. An information acquisition phase may be concurrent or consecutive with respect to an information processing phase. In accordance with various game formats, acquired data is processed to accomplish the functional operations, as for a contest, a lottery, and so on.

In specific implementations or formats, the system may use various criteria as a basis for awarding credits or points to callers, e.g. interrelated processing or processing with external data, source or random. Formats may make awards for proper responses, as question answers. Also, time may be introduced as a factor in relation to awards. Questions to callers may be variously selected, as from memory banks classified with varying orders of difficulty. Also, progressive stages of play may be invoked in a format to selectively access certain awards during a single call or a series of calls to isolate subsets and sub-subsets of callers. In that regard, award points may be tallied and accessible in a cache memory for prompt accounting reports. Thus, point accounts may be reported, individually or relatively.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

As required, a detailed illustrative embodiment of the present invention is disclosed herein. However, physical communication systems, data formats, and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
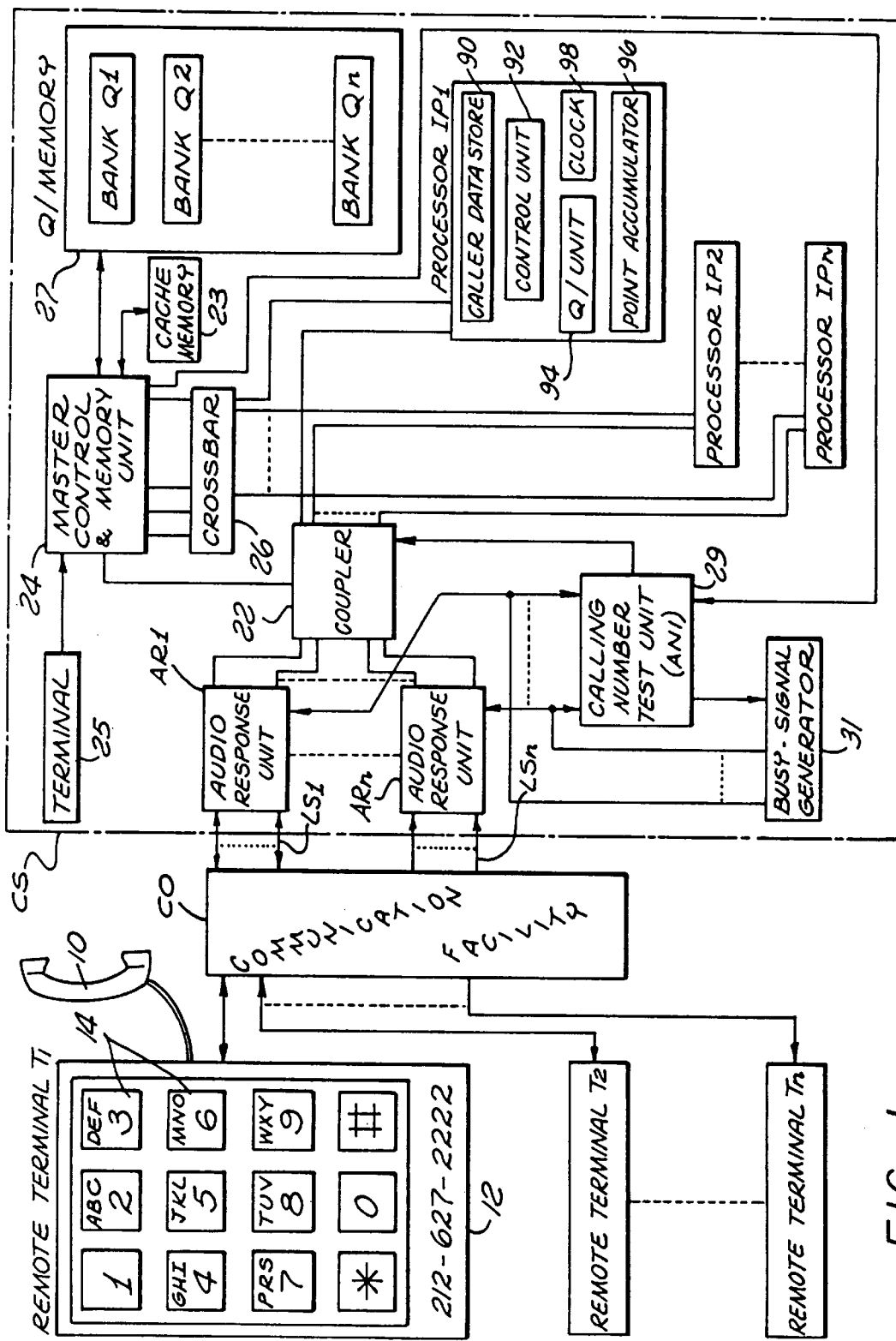
FIG. 1 is a block diagram of a system constructed in accordance with the present invention.

Referring initially to FIG. 1, a series of remote telephone-instrument terminals T1 through Tn are represented (left). The terminals are generally similar, and accordingly, only the terminal T1 is shown in any detail. The exemplary telephone terminal T1 is represented to include a hand piece 10 (microphone and earphone) and a panel 12 provided with a rectangular array of push buttons 14 in the conventional configuration. Of course, the hand piece 10 accommodates analog signals while the panel 12 is a digital apparatus. Generally in accordance herewith, the hand piece 10 serves to manifest vocal prompts or cues to the caller.

In accordance with conventional telephone practice, alphabetic and numeric designations are provided on the buttons 14. For example, several of the buttons 14 carry three letters along with a decimal digit. Specifically, the button designated with the numeral "2" also carries the letters "A", "B" and "C". In that manner, the buttons 14 encompass the numerals "0–9", two symbols, and the alphabet except for the letters "Q" and "Z". Consequently, the buttons 14 accommodate the entry of decimal data, and to some extent alphabetic data.

The buttons 14, designated with symbols and "*" and "#", along with the numeral "0" can be used by predetermined assignment to represent the letters "Q" and "Z" or any of a variety of other data or command components.

The remote terminals T1 through Tn represent a multitude of conventional telephone terminals coupled to a communication facility CO that may take the form of a comprehensive public telephone system. In accordance with the present system, the terminals T1–Tn operate through the telephone communication facility CO to be coupled with a central station CS.

Generally in accordance with the present development, individual callers use the individual telephone terminals T1 through Tn to interface the station CS (in a game format) through the communication facility CO. Depending on individual formats, the data of individual callers may be collected, correlated and tested by the station CS according to programs and external data. As a result, a select subset of the callers may be isolated and identified.

At any instant of time, the collective interface involving the communication system CO and the processing station CS may involve calls from several thousand of the terminals T1–Tn. Accordingly, the station CS may take the form of a sizable computer or mainframe. Although numerous possible configurations are available, for purposes of convenient illustration and explanation, the central station CS of the disclosed embodiment includes a plurality of audio response units AR1–ARn (left) and cooperating individual processors IP1–IPn (lower right) coupled to receive call data, as through a call distributor (not shown).

At this stage, some specific aspects of the communication interface are noteworthy. Generally, by telephonic dialing, the communication facility CO couples select terminals T1–Tn to select of the audio response units AR1–ARn. For example, as a result of dialing a specific telephone number at the remote terminal unit T1, the communication facility CO might couple the terminal unit through one of several sets of lines LS1–LSn to the audio response unit AR1. The caller at the terminal T1 accordingly is ultimately interfaced in a game format with the processor IP1.

From the audio response units AR1–ARn, lines LS1–LSn pass through a switch coupler 22 for select communication with the individual interface format processors IP1–IPn. As indicated above, while the interface processors IP1–IPn are illustrated as separate and distinct units, it is to be understood that various structural processing combinations based on time sharing, parallel processing, compiler techniques, bus technologies and other well known computer techniques may be employed variously to accomplish the objective processing as explained in detail below. As the processors IP1–IPn are similar, only the processor IP1 is shown in any detail in FIG. 1. Note also that various of the structures and functions of the processors IP1–PIn may be incorporated in the units AR1–ARn. Of course, specific arrangements and configurations will likely be implemented based on currently available hardware and software.

The coupler 22 also is connected to a master control and memory unit 24 which incorporates substantial memory and programmable computing capability. The unit 24 is associatively coupled to: a cache memory 23 (right), a manual terminal 25 (upper left), a question memory bank 27 (upper right), a calling number test unit 29 (lower left) and through a crossbar 26 (below) to the processors IP1–IPn. Note that both the function and structure of cache memories for storing current data and crossbars for selectively interconnecting multiple parallel structures are well known in the computer arts. For a detailed description of cache memories and crossbars, see the book, "High-Performance Computer Architecture" by Harold S. Stone, published by Addison-Wesley Publishing Company, 1987.

The calling-number test unit 29 (lower left) essentially is a comparator or coincidence device. For example, the unit 29 may take the form of a look-up table for storing negative telephone numbers that are unacceptable. The number received in conjunction with a call, as by automatic number identification (ANI) equipment is supplied through a receiving unit AR1–ARn before the call is "answered". If addressing the look-up table (negative list) in the test unit 29 with the calling number indicates registration of the number, a busy signal generator 31 is actuated and the involved unit AR1–ARn supplies a busy signal to the caller, declining the call. Accordingly, as described in detail below, disqualified calling numbers are rejected before being "answered".

As indicated above, the coupler 22 functions as a switch as well known in the prior art to establish line couplings from one of the audio response units (AR1–ARn) to one of the interface processors IP1–IPn. The operation of the coupler 22 is implemented in association with the unit 24 which may be programmed to execute specific control and memory functions as detailed below. Again the division of functions between the unit 24, the units AR1–ARn and the processors IP1–IPn may vary considerably depending on available structures and techniques. Accordingly, the disclosed system is deemed to be merely exemplary.

Generally, the interface processors IP1–IPn receive basic record data from the unit 24 and current data from the terminals T1–Tn. In a multiple format configuration, operating program data either may be initially developed in the processors IP1–IPn or supplied from the unit 24. In any exemplary format, a packet of data is assembled in one of the processors IP1–IPn during an interface with one of the terminal units T1–Tn. After being organized in a cell, the data packet may be stored in the unit 24 for subsequent use. Accordingly, an inventory of game participants is developed with their data cells available for repeated use. Concurrently, significant data, as for example data relating to the highest current game scores, may be abstracted in the cache memory 23 for prompt reporting.

Of the wide variety of operating formats and game applications accommodated by the present system, it will be apparent that certain elements have reoccurring significance in various combinations. Specifically, such elements include: (1) utilizing the called telephone number to select a specific operating format, (2) screening or selecting callers who will be accepted based on various criteria including received telephone numbers (ANI, DNIS) for screening before call acceptance (going off hook), (3) designating callers, as with manually or automatically provided telephone number data or computer-generated designations to enable subsequent positive identification, (4) providing a selection of cues (questions) for callers as from data banks of various difficulty levels, (5) enabling callers to specify degrees of risk (points), (6) relating response data (answers) to time as a further criterion, (7) using external data (random or source) for processing caller data to isolate a subset (or series of subsets) as by interrelated or independent processing, and (8) accumulating caller scores over a substantial period with key data abstracted for easy access (cache).

With respect to the data processing aspects, exemplary elemental features include the utilization of external data not available during the interval of gathering data, the utilization of an interrelationship between the composite data collected during a data acquisition period, and the utilization of time or sequence as a criterion to determine a subset.

In the development of data cells, current data is provided from the master control and memory unit 24 and the question memory 27 for interfacing a caller. Specifically, as indicated above, the unit 24 incorporates a memory for storing individual caller cells addressed by caller identification. Accordingly, records are created and maintained on individual callers indicative of identification, qualification and the results of participation in a game or games.

For use in association with various games, the question memory 27 incorporates a plurality of question banks Q1–Qn, each storing questions of different classification as with respect to difficulty. For example, the question bank Q1 may store relatively easy questions, with the level of difficulty progressively increasing through the question banks to the bank Qn. Accordingly, the master control and memory unit 24 may be actuated in accordance with a format to select questions of a predetermined character by designating a specific one of the banks Q1–Qn. Consider some specific operations as may be implemented with respect to the question memory 27. A telephone number alone may designate a specific question bank Q1–Qn, for example, the number being either "called" or "calling" and provided automatically (ANI, DNIS) or manually.

In a more elaborate example, telephone numbers provided automatically may be compared with telephone numbers provided manually to access a select question bank Q1–Qn only in the event of coincidence. Also, telephone numbers may be used in logic combinations with other data to select a question bank Q1–Qn. To consider some examples, a simple application might eliminate a bank of questions used previously in an interface with a calling number. Alternatively, banks may be eliminated if used previously for either or both of an automatically provided number and a manually provided number. Of course, inconsistent numbers might also prompt further programmed inquiries.

The selection of a question bank also may be based on other data, as data generated during an interface. For example, questions of progressive orders of difficulty may be propounded as a sequence interrupted by a incorrect answer.

Figure 2:
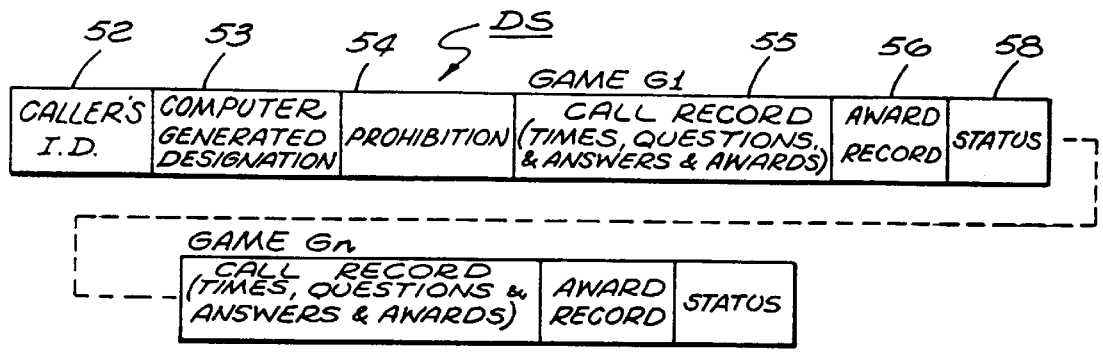
FIG. 2 is a fragmentary diagrammatic representation of a storage cell format as may be developed in the system of FIG. 1.

Returning to the structure of the master control and memory unit 24 and its related operations, data cells DS are stored for each caller and may involve a format as illustrated in FIG. 2. Specifically, a block 52 is indicated to represent a field for a caller's established identification. A block 53 carries a computer-generated designation for the caller. A block 54 indicates a prohibition field designating a caller either as being totally prohibited or prohibited with respect to certain game formats. As indicated above, a negative list of prohibited callers may alternatively or also be stored as a look-up table.

The balance of the data cell DS is dedicated to game format sections G1–Gn. In FIG. 2, three exemplary game sections are illustrated. Specifically, in a game section G1, designated field 55 carries a call record (times, questions, answers and awards), a field 56 indicates a caller's current award record, and a field 58 indicates a caller's status. Generally, variations or duplicates of the fields 55, 56 and 58 are provided in game sections G2–Gn for alternative game formats. Games may vary widely with caller data processed accordingly. For example, caller data may be processed individually or in interrelated patterns, as with reference to external data (random or source) to establish winners as subsets or progressive subsets.

To consider a specific example, a format now will be described wherein television viewers participate in a game show for prizes. Along with expanding participation of television viewers in a program, the format also has the potential of expanding general program interest.

Game shows for the exemplary format may take any of a wide variety of different forms in which studio contestants compete for prizes. However, in utilizing the system of the present invention to involve remote participants, it may be desirable to preliminarily qualify and designate callers. Specifically, prior to participating in a game, interested participants might interface the system as depicted in FIG. 1. In the course of an exchange, a data cell is initiated for each caller in the unit 24. The initial fields 52, 53 and possibly 54 are accordingly loaded.

With preregistration, at the time of participation, callers are qualified, initially by avoiding a negative list then by presence on a positive list, as by reference to an assigned memory cell. Thereafter, the interface data is received to supplement prior data. For example, a caller might select a studio audience participant with whom the caller is to be allied. The interface operation essentially may involve a voice generator in the associated audio response unit, e.g. unit AR1 (FIG. 1) receiving cue signals from the processor IP1 to activate the remote telephone unit T1 to speak an instruction: "If you wish to play with Player No. 1, please push button No. 1; if you wish to play with Player No. 2, please push button No. 2 . . . and so on". The caller also may be instructed to indicate the extent of a wager (points at risk). For example, "Push the number button indicating the points you wish to risk".

The received participant data or computed result data is stored in the active processor IP1 for return to an assigned cell in the unit 24. Scores are compared or otherwise interrelated between individual processors IP1–IPn to provide an abstract of key data in the cache memory 23. For example, the highest scores may be stored so that caller reports may cover a participant's score as well as indicating the significance of that score to others. A report message might state: "Your score is now 537. The highest score is 641 and the average score is 316. Good luck." Thus, individual accounts can be given for each of the calling participants dependent upon their success in association with a studio player. Thus, after an interval of play, the processing units, as the unit 92 (FIG. 4), may isolate a subset of scores in the cache memory 23. Of course, various arrangements may be provided ultimately for rewarding a select subset of winners or persons qualified for play at a higher level.

As explained, the above format generally involves a real-time game show with an on-line operating format. A somewhat similar format may involve non-real-time operation and in that sense, callers may interface the system of the present invention before and after the show; however, not primarily during the show. As examples, such a game format might involve: a quiz for callers based on their ability to perceive and remember occurrences within the show, a word game (Scrabble) or any of a multitude of games involving knowledge, time, random events and so on.

Figure 3:
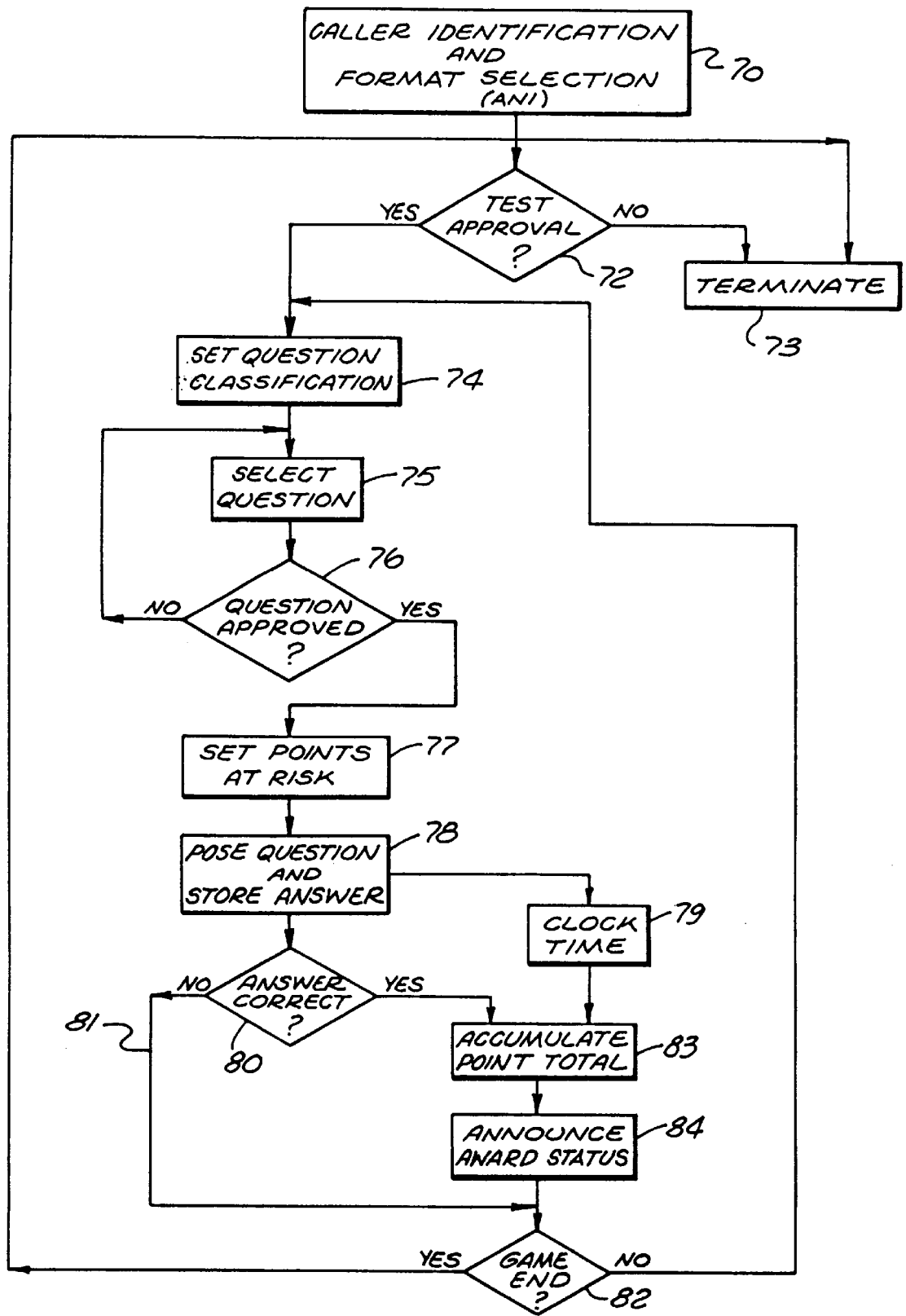
FIG. 3 is a flow diagram of one operating format of the system of FIG. 1.

As indicated above, a multitude of game formats may be executed based on an elemental operating process hereof as will now be considered with reference to FIG. 3. An initial operation involves caller identification and format selection. As indicated above, caller identification may have been previously established or may be established preliminarily in the course of a call to participate in a game. Caller identification may involve telephone terminal data as provided by ANI telephone equipment. Also, the designation of a specific format at the central station CS may be commanded on the basis of the called telephone number (may be provided by DNIS telephonic equipment). Thus, in certain instances, the caller identification and the format selection may occur with no conscious involvement by the caller. These operations are represented by the block 70 in FIG. 3.

With the identification of a caller, as represented in FIG. 3, the next step involves approving the caller for participation as represented by the query block 72. For example, callers might be tested in relation to negative or positive lists, personal identification numbers may be checked, a use-rate calculator may be involved or a caller may be tested or qualified with respect to various payment schemes. Accordingly, individual callers are ultimately either approved or disapproved.

As indicated above, calls that are determined to be unqualified based on ANI signals may be rejected without completing a communication circuit, i.e. "answering". Otherwise, callers disapproved from the test block 72 receive a termination message as represented by the block 73. The termination procedure may be variously formed, as with a spoken message or signals prompting the caller to hang up.

Approved callers encounter the next step in the process as represented by the block 74 involving the selection of a desired class of questions. Of course, specific formats may vary widely; however, as a simple example, with correct answers, a caller might be given questions in an increasing order of difficulty. Alternatively, orders of difficulty may be related to individual calls for participation in the game. As still another possibility, orders of difficulty may be related to a scale of risk, reward or be the choice of the caller. In any event, determining an order of difficulty prompts the master control and memory unit 24 (FIG. 1) to draw a stored question from a select one of the memory banks Q1–Qn. Thus, a question is selected in a process step as indicated by a block 75 (FIG. 3).

Selected questions are tested as indicated by a query block 76. For example, selected questions may be compared with previous questions propounded to a caller (stored in the field 55) so as to avoid duplications. If a question is determined to be duplicative, or otherwise inappropriate, the process returns to the step of block 75 for the selection of another question. With the selection of an approved question, the process proceeds to the next step of determining the risk to be undertaken by the caller (block 77). For example, a caller may be instructed to indicate the extent of a wager. Specifically, the Q might be: "Please push the number button indicating the points you wish to risk". As represented in FIG. 3 by the block 77, the step establishes a degree of risk for the caller.

With the degree of risk determined and the question selected, the question is vocalized to the caller as indicated by block 78. Typically, the question may be answered by depressing a button or buttons 14 (FIG. 1) at the remote terminal T1. For example, "What are the initials of the fourth President of the United States?"

With the posing of a question, a time clock is checked as indicated by the block 79 for determining the interval between question and correct answer. A query block 80 represents the determination of whether or not a correct answer is received. If a correct answer is not received, the operation advances to a query block 82: "Game End?" as discussed below.

A correct answer advances the process from the step of the block 80 to a step represented by a block 83, i.e. of accumulating the award points. The step of the block 83 involves the determination of a correct answer (block 80) and the time required for the correct answer (block 79). A combination of time and the correct answer resolves the award points that are accumulated with any prior or existing point total as represented by the block 83. The resulting total is announced to the caller in a step illustrated by block 84. As explained above, the announcement may refer to comparative significant scores. As a part of a winning step in the process, the caller may be placed in direct vocal communication with an operator. Specifically, the unit 24 (FIG. 1) couples the call to the terminal 25 and supplies related prompting data for display.

The step of announcing a total point count to a caller advances the process to the query represented by block 82, i.e. determine whether or not the game phase has ended. If the game phase has ended, the process proceeds to the termination step as indicated by the block 73 (upper right). If the game phase has not ended, the process returns to the block 74, involving the preliminary step of selecting a question. Of course, the game may involve one or several questions during the course of each telephone call. At the end of a game phase, the data is returned to the unit 24 as for processing or future retrieval during another game phase.

The process as illustrated in FIG. 3 is executed in the system of FIG. 1 by an association between one of the processors IP1–IPn and the master control and memory unit 24 along with the question memory 27. Considering the processor IP1 generally, with the qualification of a call, a data cell for the caller is established in a data store 90 in the processor IP1. Somewhat similarly, the game format for the call is set in a control unit 92 within the processor IP1.

Also, with the operation of setting up the processor IP1, the master control and memory unit 24 functions with the question memory 27 and a specific one of the question banks Q1–Qn to isolate an operative question that is stored in a question unit 94 of the processor IP1. The select question is propounded to the caller through the coupler 22 and an audio response unit, e.g. unit AR1. Cued by the question (audio), the caller is expected to key in an answer to provide digital response data. Upon the occurrence of a correct answer, a point accumulator 96 (processor IP1) in combination with a clock 98 (processor IP1) determines a point award that is accumulated in the caller data store 90. Thus, the process proceeds until the call is terminated with the possibility of the caller acquiring points according to the predetermined operating format.

Figure 4:
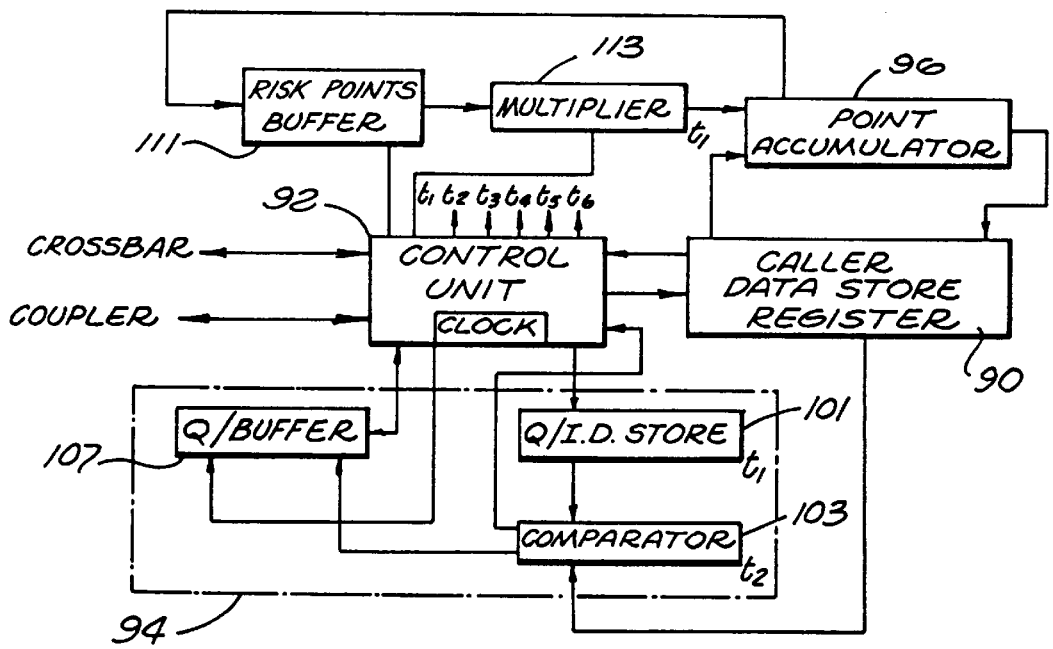
FIG. 4 is a block diagram of a processor or function unit as may be employed in the system of FIG. 1.

The components of the processor IP1 are shown in FIG. 4 arranged and intercoupled for operation. Note that similar identification numerals appear in FIGS. 1 and 4.

To treat an illustrative operation comprehensively with reference to FIGS. 1 and 4, again assume an exemplary format that is associated with a television broadcast. Specifically, after watching the broadcast of a television show (possibly a serial episode) the participant actuates the push buttons 14 at one of the remote terminals T1–Tn to accomplish an interface communication with the select operating format. For example, the caller may actuate the buttons 14 for the station number "1-900-555-7777" to identify the game format of current description.

With the responsive operation of the communication facility CO, the caller is coupled to an audio response unit, e.g. unit AR1. A further connection is made from the audio response unit AR1 through the coupler 22 to the unit 24.

Operating through the communication facility CO, one of the audio response units AR1–ARn, the coupler 22 and the master unit 24, the initial contact may be variously implemented. For example, a call signal as provided to a select audio response unit AR1 may include representations of the caller's number and, accordingly, access a data cell on the caller. A general negative file may be carried in the master unit 24.

Recognizing the various possibilities, assume that at the outset of the interface, a voice generator in the audio response unit AR1 is actuated by the unit 24 to greet the caller. For example, the caller might be greeted: "Thank you for calling XYZ Company to participate in the XYZ Game".

As explained above, the caller may be variously qualified, for example, in a format to determine if the caller is registered, has a proper identification or has a key number. In any event, at some stage of operation, the master unit 24 provides the data cell for the caller to the processor IP1 which is stored in the caller register 90 (FIG. 4). As suggested above, if no data exists on the caller, the operating format may variously qualify or condition the caller with the result that data is established for the caller as indicated in FIG. 2.

In executing the specific process of a format, the control unit 92 (FIG. 4) provides timing signals t1–t6 to sequence specific components. Generally, the individual operations attendant each of the timing intervals (manifest by the high level of a binary signal) are as follows:

| Interval or Signal | Function |
|---|---|
| t1 | store tentative question |
| t2 | check tentative question |
| t3 | register question and determine risk points |
| t4 | operative question exchange interval (cue and response) |
| t5 | award points |
| t6 | accumulate points-and store |

To consider the overall operation as related to structure, the master unit 24 (FIG. 1) operates with one of the audio response units AR1–ARn initially to establish criterion for selecting a question. The criterion may involve the status of the caller, the sequence of the format, the nature of the game, or any of various other considerations. However, it is important to appreciate that the question memory 27 (FIG. 1) incorporates a multitude of banks Q1–Qn each of which contains questions serving different criteria, e.g. different levels of difficulty. Essentially, each question within each of the banks Q1–Qn is addressed by a specific designation which also indicates a class of question.

Upon the selection of a class of question, a specific tentative question is identified and an identification code is placed in a question identification storage 101 (FIG. 4) contained within the question unit 94. Accordingly, the identified question is tested against previous questions posed to the caller. Specifically, the record of the caller's data cell (FIG. 2) includes identification of prior questions posed. The identifications of those questions are sequentially supplied from the register 90 (FIG. 4) to a comparator 103 that is also coupled to the store 101. If a coincidence occurs, a signal is provided from the comparator 103 to the control unit 92 commanding the master unit 24 (FIG. 1) to select another tentative question. The test operation is then repeated as indicated by the block 76 in FIG. 3.

If no coincidence is detected between the prior and the tentative question, the comparator 103 (FIG. 4) provides a signal to a buffer 107 for accepting the question. Specifically, upon approval of a question, the master unit 24 (FIG. 1) addresses the select memory bank (Q1–Qn) to supply the selected question through the crossbar 26 and the control unit 92 (FIG. 4) to be registered in the buffer 107.

Concurrently with the operation of selecting a question for a specific interface, the system determines the degree of risk involved with the question. Specifically, as explained above, the caller may interface the master unit 24 through one of the audio response units AR1–ARn to establish points at risk, the value of which is represented by signals supplied through the crossbar 26 (FIG. 1) to the control unit 92 (FIG. 4) and set in a risk points buffer 111. Accordingly, with the degree of risk established (buffer 111) and the question established (buffer 107) the system proceeds to cue the caller with the select question.

The caller's answer is reduced to a digital format as a result of actuating the keys 14 at the remote terminal. Accordingly, digital signals are provided through the communication facility CO and the audio response unit AR1 to the coupler 22 interfacing the processor IP1. Within the processor IP1, the control unit 92 tests the answer while metering the time required for the answer. Typically, the timing will be in terms of seconds. The control unit determines whether or not the answer is correct and if so, the amount of time required for the answer. As a result, factors may be determined as by the use of a simple look-up table. For example, if a correct answer is provided within two seconds, a factor of "3.0" may be formulated. A correct answer within five seconds might produce a factor of "2.5" while a correct answer within seven seconds produces a multiplier factor of "2.0".

Signals representative of the multiplier factor are provided from the control unit 92 to a multiplier 113 that is also coupled to receive signals representative of the risk points from the buffer 111. Accordingly, the value of the risk points is multiplied by the determined factor to produce a product supplied to the point accumulator 96 to be added to the residual value. Accordingly, a fresh accumulation is determined. Of course, if the correct answer is not provided, the multiplier 113 is dormant with the consequence that the caller is left with the residue of points in the accumulator 96 remaining after withdrawing the points-at-risk.

After each cycle of processing a question, the accumulated points may be announced to the caller simply by actuating the audio response unit AR1. As indicated above with respect to FIG. 3, when the game is concluded, the call is terminated in accordance with a predetermined subformat.

In relation to the disclosed embodiment, it may be seen that the system affords certain distinct features important with respect to interface operation. Specifically, the provision of a plurality of data banks within a question memory accommodates various formats for question selection, e.g. order of difficulty, format state, geographic location and so on. Also, the feature allowing a caller to determine the points at risk affords considerable flexibility of operation with attendant caller participation. The feature incorporating time as a criterion for awards also affords considerable flexibility in formulating effective game formats.

Furthermore, depending on the detailed operation of the system, individual data packets for cells of callers afford an effective technique for accumulating data over a progressive game period. In a related context, qualification of callers is significant in general and particularly noteworthy in relation to declining select calls before "answering".

In view of the above description, it will be apparent that the system of the present invention may be effectively used in telephonic interfaces to accommodate flexibility and control by a caller in accordance with a predetermined format. Although the disclosed embodiment is directed to a game operation, it will be apparent that the system may be variously embodied to accommodate a wide variety of telephonic interface operations. Furthermore, it will be apparent that while the disclosed embodiment comprises specific elements and configurations, any of a variety of structures might well be utilized. Accordingly, the scope hereof is deemed to be as set forth in the claims below.

What is claimed is:

1. A process for executing game formats in association with a communication facility for routing calls including remote terminal apparatus for individual playing callers, wherein said remote terminal apparatus includes a telephonic instrument with voice communication means and digital input means in the form of an array of alphabetic, numeric buttons for providing data, said process including the steps of:

interfacing said communication facility to provide voice signals for cueing callers and receiving responsive digital data in accordance with a select format;

storing data to identify callers and indicate caller scores;

storing a plurality of batches of questions for use in said formats;

selecting a question from a specific batch of questions to cue a caller;

cueing a caller with said question; and testing the response of a caller to a selected question and scoring the response accordingly in the caller's score.

2. A process according to claim 1 further including a step of testing a selected question prior to cueing said caller.

3. A process according to claim 2 further including a step of recording questions previously used to cue callers and wherein said step of testing tests previously used questions to cue callers against a selected question.

4. A process according to claim 1 further including a step of assigning data cells to callers to record identification and score data.

5. A process according to claim 1 wherein said step of testing a response comprises testing data represented by number identification signals provided automatically by said communication facility to indicate called or calling numbers.

6. A process for executing game formats in association with a communication facility for routing calls including remote terminal apparatus for individual playing callers, wherein said remote terminal apparatus includes a telephonic instrument with voice communication means and digital input means in the form of an array of alphabetic, numeric buttons for providing data, said process including the steps of:

interfacing said communication facility to provide voice signals for cueing callers and receiving responsive digital data in accordance with a select format;

storing data to identify callers and indicate caller scores;

cueing a caller and processing the caller's response with reference to time to establish a score value based on time and responsive answer data; and reflecting score values in the data stored to indicate caller scores.

7. A process according to claim 6 further including a step of cueing a caller to determine a value at risk and also establishing said score value on said value at risk.

8. A process according to claim 6 further including a step of abstracting and registering said score values.

9. A process according to claim 8 further including the step of reporting score values to a caller as abstracted and registered.

10. A process according to claim 6 further including a step of assigning a data cell to a caller to receive a plurality of caller scores.

11. A process according to claim 10 wherein said step of assigning a data cell further includes receiving data represented by number identification signals provided automatically by said communication facility to indicate called or calling numbers.

12. A process for executing game formats in association with a communication facility for routing calls including remote terminal apparatus for individual playing callers, wherein said remote terminal apparatus includes a telephonic instrument with voice communication means and digital input means in the form of an array of alphabetic, numeric buttons for providing data, said process including the steps of:

interfacing said communication facility to provide voice signals for cueing callers and receiving responsive digital data in accordance with a select format;

storing data to identify callers and indicate caller scores;

cueing a caller and processing the caller's response to establish a value at risk for the caller; and testing the response of a caller to a selected question and scoring the response accordingly in the caller's score reflecting the established value at risk.

13. A process according to claim 12 wherein said step of storing data includes storing data represented by number identification signals provided automatically by said communication facility to indicate called or calling numbers.

14. A process according to claim 12 further including a step of assigning data cells to callers to record identification and score data.

15. A process according to claim 12 further including a step of assigning a data cell to a caller to receive a plurality of caller scores.

16. A process for executing formats in association with a communication facility for routing calls including remote terminal apparatus for individual playing callers, wherein said remote terminal apparatus includes a telephonic instrument with voice communication means and digital input means in the form of an array of alphabetic, numeric buttons for providing data, said process including the steps of:

receiving associated telephone number signals upon the instance of a call from one of said remote terminal apparatus;

testing said associated telephone number signals with respect to stored data to determine the acceptability of said call from said one of said remote terminal apparatus as indicated by an acceptability signal;

accepting said call from said one of said remote terminal apparatus conditioned on said acceptability signal; and interfacing said communication facility to provide voice signals for cueing callers and receiving responsive digital data in accordance with a select format for accepted calls; and testing to prevent duplication of previously provided cues to at least certain of said callers.

17. A process according to claim 16 wherein said step of receiving associated telephone number signals includes receiving data represented by number identification signals provided automatically by said communication facility to indicate calling numbers.

18. A process according to claim 16 wherein said step of testing is accomplished prior to accepting said call whereby audio communication via a voice generator is not established for calls that are not accepted.

19. A process according to claim 16, wherein the process executes formats relating to games.

20. A process according to claim 16, further comprising a test based upon a use-rate calculator associated with the select format.

21. A process for analysis of data for use with a communication facility for routing calls including remote terminal apparatus for individual callers, wherein said remote terminal apparatus comprises a telephonic instrument including voice communication means and digital input means in the form of an array of alphabetic numeric buttons for providing identification and other data, said process including the steps of:

interfacing said communication facility to provide voice signals and receive digital identification of identification data developed by said terminal apparatus under control of said individual callers;

generating voice signals and supplying said generated voice signals to actuate said terminal apparatus, as to provide vocal operating instructions to a caller;

qualifying said caller based on said digital identification of identification data developed by said terminal apparatus under control of said caller;

designating callers based on a computer generated number;

initiating files and storing data from qualified callers including,
(1) designation data as indicated by said computer generated number, and
(2) said identification data developed by said terminal apparatus under control of said caller;
providing external data signals distinct from said designation data provided to callers; and
comparing said designation data provided by callers and analyzing said designation data with said external data in combination to isolate a select subset of said qualified callers.

22. A process according to claim 21 wherein said external data signals comprise random value signals.

23. A process according to claim 21 wherein said comparing further includes interrelated processing as between said designation data.

24. A process according to claim 21 wherein said identification data includes data represented by number identification signals provided automatically by said communication facility to indicate called or calling numbers.

25. A process according to claim 21, further comprising the step of:
providing sequence signals representative of sequence data indicating the sequence of a call.

26. A process for executing game formats in association with a communication facility for routine calls including remote terminal apparatus for individual playing callers, wherein said remote terminal apparatus includes a telephonic instrument with voice communication means and digital input means in the form of an array of alphabetic, numeric buttons for providing data, said process including the steps of:
interfacing said communication facility to provide voice signals for cueing callers and receiving responsive digital data in accordance with a select format;
storing data to identify callers and indicate caller scores;
cueing a caller and processing the caller's response with reference to defining an initial subset; and
further cueing a caller and reflecting score values in the data stored to indicate caller scores.

27. A process according to claim 26 wherein said further cueing and reflecting defines a subsequent subset.

28. A system for executing game formats in association with a communication facility for routing calls including remote terminal apparatus for individual playing callers, wherein said remote terminal apparatus includes a telephonic instrument with voice communication means and digital input means in the form of an array of alphabetic, numeric buttons for providing data, said system comprising:
means for interfacing said communication facility to provide voice signals for cueing callers and receiving responsive digital data in accordance with a select format;
means for storing data to identify callers and indicate caller scores;
means for storing a plurality of batches of questions for use in said formats;
means for selecting a question from a specific batch of questions to cue a caller;
means for cueing a caller with said question; and
means for testing the response of a caller to a selected question and scoring the response accordingly in the caller's score.

29. A system according to claim 28 wherein said means for storing data includes means for receiving and storing data represented by number identification signals provided automatically by said communication facility to indicate called or calling numbers.

30. A system for executing game formats in association with a communication facility for routing calls including remote terminal apparatus for individual playing callers, wherein said remote terminal apparatus includes a telephonic instrument with voice communication means and digital input means in the form of an array of alphabetic, numeric buttons for providing data, said system comprising:
means for interfacing said communication facility to provide voice signals for cueing callers and receiving responsive digital data in accordance with a select format;
means for storing data to identify callers and indicate caller scores;
means for cueing a caller and processing the caller's response with reference to time to establish a score value based on time and responsive answer data; and
means for reflecting score values in the data stored to indicate caller scores.

31. A system according to claim 30 wherein said means for storing data includes means for receiving and storing data represented by number identification signals provided automatically by said communication facility to indicate called or calling numbers.

32. A system for executing game formats in association with a communication facility for routing calls including remote terminal apparatus for individual playing callers, wherein said remote terminal apparatus includes a telephonic instrument with voice communication means and digital input means in the form of an array of alphabetic, numeric buttons for providing data, said system comprising:
means for interfacing said communication facility to provide voice signals for cueing callers and receiving responsive digital data in accordance with a select format;
means for storing data to identify callers and indicate caller scores;
means for cueing a caller and processing a caller's response to store a value at risk for the caller; and
means for testing the response of a caller to a selected question and scoring the response accordingly in the caller's score reflecting the established value at risk.

33. A system for executing game formats in association with a communication facility for routine calls including remote terminal apparatus for individual playing callers, wherein said remote terminal apparatus may include a conventional telephone instrument with voice communication means and digital input means in the form of an array of alphabetic, numeric buttons for providing data, said system comprising:
means for receiving associated telephone number signals upon the instance of a call from one of said remote terminal apparatus;
means for testing said associated telephone number signals with respect to stored data to determine the acceptability of said call from said one of said remote terminal apparatus as indicated by an acceptability signal;
means for accepting said call from said one of said remote terminal apparatus conditioned on said acceptability signal; and
means for interfacing said communication facility to provide voice signals for cueing callers and receiving responsive digital data in accordance with a select format for accepted calls; and
testing to prevent previously provided cues to at least certain callers.

* * * * *

UNITED STATES PATENT AND TRADEMARK OFFICE
CERTIFICATE OF CORRECTION

PATENT NO.    : 6,151,387
DATED         : November 21, 2000
INVENTOR(S)   : Ronald A. Katz It is certified that error appears in the above-identified patent and that said Letters Patent is hereby corrected as shown below:

Title page,
Item [56], Reference Cited, U.S. PATENT DOCUMENTS,
after "4,355,207     10/1982     Curtin" please insert the following
-- 4,360,827    11/1982         Braun --;
After "5,003,574    3/1991" please delete "Deng" and replace with the following
-- Denq --
FOREIGN PATENT DOCUMENTS, please delete "2009937" and replace with the following -- 2009937-2 --
Please delete "0 229 170" and replace with the following -- 0 229 170A --
Please delete "0 568 114" and replace with the following -- 0 568 114A --
Please delete "0 620 669" and replace with the following -- 0 620 669A --
Please delete "2929416" and replace with the following -- OS2929416 --
Please delete "3726366" and replace with the following -- OS3726366 --
Please delete "4005365A1" and replace with the following -- DE4005365 A1 --
Please delete "2184327" and replace with the following -- 2184327A --
Please delete "2 230 403" and replace with the following -- 2 230 403A --
OTHER PUBLICATIONS, in the entry which begins "The Voice Response..." please delete "Turnes" and replace with the following -- Turns --
In the entry which begins "Look Ma..." please delete "doesmany" and replace with the following -- does many --
In the entry which begins "Moosemiller, J.P.," please delete "I" and replace with the following -- 1 --
In the entry which begins "Perdue, R.J.," please delete ",AT&T" and replace with the following -- , AT&T --
In the entry which begins "Kaiserman, D.B.," please delete "Paleis" and replace with the following -- Palais --

Column 1,
Line 18, please insert the following paragraph -- Also, application Serial No. 08/559,538 is directly a continuation-in-part of application Serial No. 07/335,923 filed April 10, 1989, and entitled "Telephonic-Interface Statistical Analysis System," which was a continuation of application Serial No. 07/194,528 filed May 16, 1988, and entitled "Telephonic-Interface Statistical Analysis System," now U.S. Patent No. 4,845,739, which was a continuation-in-part of application Serial No. 07/018,244 filed on February 24, 1987, and entitled "Statistical Analysis System For Use With Public Communication Facility," now U.S. Patent No. 4,792,968, which was a continuation-in part of application Serial No. 06/753,299 filed on July 10, 1985, and entitled "Statistical Analysis System For Use With Public Communication Facility," now abandoned. The benefit of the earlier filing dates in the United States is claimed under 35 U.S.C. § 120. --

UNITED STATES PATENT AND TRADEMARK OFFICE
CERTIFICATE OF CORRECTION

PATENT NO. : 6,151,387
DATED : November 21, 2000
INVENTOR(S) : Ronald A. Katz

It is certified that error appears in the above-identified patent and that said Letters Patent is hereby corrected as shown below:

Column 1 cont.,
Line 34, at the beginning of the paragraph which now begins with "general," please insert the following -- In --

Column 7,
Line 21, after "question." please insert a hard return followed by an indentation, so that "With the selection..." becomes the beginning of a new paragraph.

Column 10,
Line 4, please delete "of"3.0"" and replace with the following -- of "3.0" --

Column 14,
Line 43, please delete "routine" and replace with the following -- routing --

Signed and Sealed this

Twenty-fourth Day of September, 2002

Attest:

JAMES E. ROGAN
Attesting Officer  Director of the United States Patent and Trademark Office